W. VIAL.
GLOBE VALVE.
APPLICATION FILED JULY 26, 1910.

1,016,306. Patented Feb. 6, 1912.

WITNESSES

INVENTOR
William Vial
By Fred'k W. Winter
Attorney

UNITED STATES PATENT OFFICE.

WILLIAM VIAL, OF SWISSVALE, PENNSYLVANIA, ASSIGNOR OF ONE-THIRD TO WILLIAM D. BERRY, OF NEW BRIGHTON, PENNSYLVANIA, AND ONE-THIRD TO JOHN VIAL, OF BRADDOCK, PENNSYLVANIA.

GLOBE-VALVE.

1,016,306. Specification of Letters Patent. Patented Feb. 6, 1912.

Application filed July 26, 1910. Serial No. 573,924.

*To all whom it may concern:*

Be it known that I, WILLIAM VIAL, a resident of Swissvale, in the county of Allegheny and State of Pennsylvania, have invented a new and useful Improvement in Globe-Valves, of which the following is a specification.

This invention relates to valves, and more particularly to high pressure cut off valves.
The object of the invention is to improve valves of the kind specified to render the same more durable and less liable to wear and derangement than similar valves as heretofore constructed.
The invention comprises the construction and arrangement of parts hereinafter described and claimed.

Figure 1:
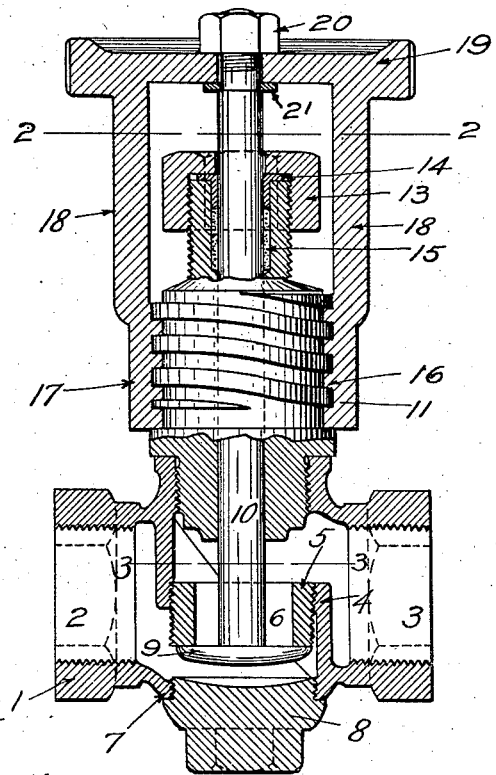
Figure 3:
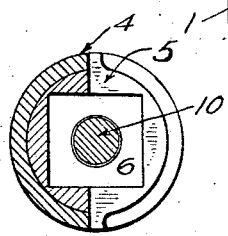
Figure 2:
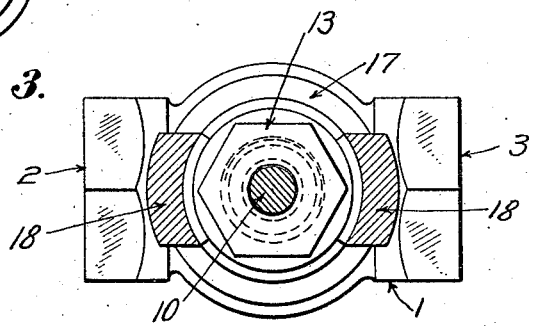

In the accompanying drawings Figure 1 is a vertical section through a globe valve showing my improvements applied thereto; and Figs. 2 and 3 are horizontal sections taken respectively on the lines 2—2 and 3—3, Fig. 1.

In the drawings 1 represents the body of the valve which is of the general form of a standard globe valve. This body is provided at one end with the internally threaded inlet connection 2 and at its opposite end with the internally threaded outlet connection 3.
The body between the inlet and outlet connections is provided with the usual partition 4 in which is the valve seat 5, the latter being a separate renewable member or bushing having a threaded connection in an opening in the partition 4, as shown, and provided with a passage 6 therethrough, said opening 6 being preferably square or of other non-circular form to receive a suitable tool by means of which said seat can be screwed into and out of the opening in the partition. Said valve seat can be inserted and removed through an opening 7 in the lower wall of the body, which opening is closed by a threaded cap 8.
Coöperating with the lower face of the valve seat 5 is the valve 9 which closes upwardly, that is with the pressure, so that the pressure normally tends to hold said valve to its seat. The valve 9 is provided with a stem 10 which extends up through an opening in the bonnet 11 having a threaded connection in the upper wall of the valve body. The upper end of the bonnet is reduced and externally threaded to receive the internally threaded cap 13 of the stuffing box, said cap acting to force the gland 14 inwardly into a recess in the upper end of the bonnet so as to compact the packing 15 around the valve stem.

The bonnet 11 is provided externally with a coarse square thread 16 which is engaged by a similarly internally threaded ring 17. The ring 17 is connected by the posts or bars 18 with an operating wheel or disk 19 which is provided with a knurled or milled edge for ease of operation. Said disk is provided centrally with an opening through which the upper end of the valve stem 10 projects. Said valve stem is secured to the disk 19 by means of a nut 20 and washer 21. Said valve stem may be clamped tightly to said disk, or have such a loose connection therewith that the disk can rotate without rotating the valve.

The operation of the valve will be readily understood from the foregoing description. The large square threads on the bonnet and ring 17 respectively are not subject to material wear, and hence have a long life. Said threads also are of high pitch and this makes the opening and closing of the valve rapid. The valve stem is perfectly smooth so that it does not materially wear the stuffing box, and as a whole the arrangement is much more durable and lasting than with similar valves as heretofore constructed in which the small valve stem is externally threaded and engages internal threads in the bonnet.

What I claim is:

1. In a valve the combination of a body provided with a passage therethrough, a seat in said body, an externally threaded projection on the body and having no connection with said seat, a valve coöperating with the seat and provided with a stem extending through an opening in said externally threaded projection, a stuffing box on said projection, an internally threaded ring directly engaging the externally threaded projection, and an operating member located above said stuffing box and connected to said ring and operatively connected to said valve stem in a manner to leave the stuffing box accessible.

2. In a valve the combination of a body provided with a passage therethrough, a valve seat in said body, a valve coöperating with said seat and provided with a stem, a bonnet threaded into said body and provided with an opening therethrough and with a stuffing box through which said valve stem projects, said bonnet being independent of the valve seat and threaded externally, an internally threaded ring directly engaging the external threads on said bonnet, a hand wheel located above said stuffing box and having the valve stem connected centrally thereto, and members connecting said hand wheel and ring and leaving the stuffing box accessible.

3. In a valve, the combination of a body provided with a passage therethrough, a valve seat in said body, a valve coöperating with said seat and provided with a stem, a bonnet threaded into said body independently of the valve seat and provided with an opening and with a stuffing box through which said valve stem projects, said bonnet being provided with coarse square external threads, a ring provided with coarse square internal threads coöperating with the external threads on the bonnet, a hand wheel located above said stuffing box and having the valve stem connected centrally thereto, and members connecting said hand wheel and ring in a manner to leave the stuffing box accessible.

In testimony whereof, I have hereunto set my hand.

WILLIAM VIAL.

Witnesses:
  JAS. L. WELDON,
  F. W. WINTER.

---

Copies of this patent may be obtained for five cents each, by addressing the "Commissioner of Patents, Washington, D. C."